United States Patent
Haze et al.

(10) Patent No.: US 9,132,349 B2
(45) Date of Patent: Sep. 15, 2015

(54) THIRD-PARTY RECOMMENDATION IN GAME SYSTEM

(75) Inventors: Oren Haze, Kfar Saba (IL); Andreas Vogel, Palo Alto, CA (US); Jason Yotopoulos, San Francisco, CA (US); Alon Barnes, Yodfat (IL)

(73) Assignee: SAP SE, Walldorf (DE)

( * ) Notice: Subject to any disclaimer, the term of this patent is extended or adjusted under 35 U.S.C. 154(b) by 574 days.

(21) Appl. No.: 13/443,217

(22) Filed: Apr. 10, 2012

(65) Prior Publication Data

US 2013/0268393 A1    Oct. 10, 2013

(51) Int. Cl.
| A63F 9/24 | (2006.01) |
| A63F 13/00 | (2014.01) |
| A63F 13/30 | (2014.01) |
| A63F 13/5375 | (2014.01) |
| A63F 13/67 | (2014.01) |
| A63F 13/69 | (2014.01) |

(52) U.S. Cl.
CPC .............. *A63F 13/12* (2013.01); *A63F 13/5375* (2014.09); *A63F 13/67* (2014.09); *A63F 13/69* (2014.09); *A63F 2300/5506* (2013.01)

(58) Field of Classification Search
CPC ....... A63F 13/12; A63F 13/47; A63F 13/505; A63F 13/3533; A63F 13/5375; A63F 13/67; A63F 13/69; A63F 13/79; A63F 13/792; A63F 2300/538; A63F 2300/5506; A63F 2300/575; A63F 2300/6027; A63F 2300/609; A63F 2300/632
USPC ...................................................... 463/40–43
See application file for complete search history.

(56) References Cited

U.S. PATENT DOCUMENTS

| 6,609,976 | B1* | 8/2003 | Yamagishi et al. ............. 463/31 |
| 7,885,902 | B1 | 2/2011 | Shoemaker et al. |
| 8,028,022 | B2* | 9/2011 | Brownholtz et al. ......... 709/204 |
| 8,298,087 | B1* | 10/2012 | Smith .............................. 463/42 |
| 8,628,423 | B2* | 1/2014 | Chung et al. .................... 463/42 |
| 8,764,561 | B1* | 7/2014 | Lan et al. ........................ 463/31 |
| 8,814,663 | B2* | 8/2014 | Vogel ............................... 463/25 |
| 8,851,966 | B2* | 10/2014 | Vogel ............................... 463/16 |
| 8,888,601 | B2* | 11/2014 | Vogel et al. ..................... 463/43 |
| 2005/0239529 | A1* | 10/2005 | Moshal ............................ 463/16 |
| 2005/0246638 | A1* | 11/2005 | Whitten ........................ 715/708 |
| 2006/0079310 | A1* | 4/2006 | Friedman et al. ............... 463/16 |
| 2006/0287106 | A1* | 12/2006 | Jensen ............................. 463/42 |
| 2008/0020845 | A1* | 1/2008 | Low et al. ....................... 463/42 |

(Continued)

OTHER PUBLICATIONS

'SAP Harnesses the Power of SAP Hana™ Platform to Deliver New Real-Time Applications' [online]. SAP Global, 2011, [retrieved on Jan. 26, 2012]. Retrieved from the Internet: <URL: http://www.sap.com/corporate-en/press/newsroom/press-releases/press.exp?pressid=17487>, 2 pages.

(Continued)

*Primary Examiner* — Milap Shah
(74) *Attorney, Agent, or Firm* — Fish & Richardson P.C.

(57) ABSTRACT

A computer-implemented method for using a third-party recommendation in a game system includes: receiving, at a recommendation engine and from a game system, current game context data provided in real time during a game in which at least one user participates; selecting, by the recommendation engine, at least one of multiple predefined actions based on at least the current game context data; and providing a response to the game system that identifies the selected at least one action for performance.

8 Claims, 6 Drawing Sheets

(56) References Cited

U.S. PATENT DOCUMENTS

| | | | |
|---|---|---|---|
| 2008/0032787 | A1* | 2/2008 | Low et al. ............... 463/29 |
| 2008/0263503 | A1 | 10/2008 | Polly et al. |
| 2009/0197681 | A1* | 8/2009 | Krishnamoorthy et al. .... 463/42 |
| 2010/0041482 | A1* | 2/2010 | Kumar et al. ............ 463/42 |
| 2010/0113155 | A1* | 5/2010 | Brownholtz et al. .......... 463/42 |
| 2010/0169067 | A1 | 7/2010 | Basel et al. |
| 2010/0169245 | A1 | 7/2010 | Basel et al. |
| 2010/0318974 | A1 | 12/2010 | Hrastnik et al. |
| 2011/0212756 | A1* | 9/2011 | Packard et al. ............ 463/1 |
| 2012/0030064 | A1* | 2/2012 | Flinn et al. .............. 705/26.7 |
| 2012/0036020 | A1* | 2/2012 | Flinn et al. .............. 705/14.66 |
| 2012/0094762 | A1* | 4/2012 | Khan ...................... 463/42 |
| 2012/0197874 | A1* | 8/2012 | Zatkin et al. ............ 707/722 |
| 2012/0225723 | A1* | 9/2012 | Webster et al. ............ 463/42 |
| 2012/0270618 | A1* | 10/2012 | Abramoff et al. ............ 463/9 |
| 2013/0005438 | A1* | 1/2013 | Ocko et al. ............... 463/25 |
| 2013/0053147 | A1* | 2/2013 | Miller .................... 463/42 |
| 2013/0090163 | A1* | 4/2013 | Edson .................... 463/31 |
| 2013/0267325 | A1* | 10/2013 | Froy et al. ............... 463/42 |
| 2013/0316795 | A1* | 11/2013 | Vogel .................... 463/25 |
| 2013/0316836 | A1* | 11/2013 | Vogel et al. ............. 463/43 |

OTHER PUBLICATIONS

Chua et al., "Mobile Alternate Reality Gaming Engine: A Usability Evaluation," *IEEE: 2010 Seventh International Conference on Information Technology*, 2010, pp. 540-545.

Mahlmann et al., "Predicting Player Behavior in Tomb Raider: Underworld," *IEEE Conference on Computational Intelligence and Games*, 2010, pp. 179-185.

'Freemium' [online]. Wikipedia, 2011 [retrieved on Mar. 9, 2012]. Retrieved from the Internet: <URL:http://en.wikipedia.org/w/index.php?title=Freemium&oldid=414378550>, 3 pages.

'FarmVille' [online]. Wikipedia, 2011, [retrieved on Mar. 9, 2012]. Retrieved from the Internet: <URL: http://en.wikipedia.org/w/index.php?title=FarmVille&oldid=413850966>, 5 pages.

'CityVille' [online]. Wikipedia, 2011, [retrieved on Mar. 9, 2012]. Retrieved from the Internet: <URL: http://en.wikipedia.org/w/index.php?title=CityVille&oldid=414797937>, 2 pages.

'The Sims Social' [online]. Wikipedia, 2011, [retrieved on Mar. 9, 2012]. Retrieved from the Internet: <URL: http://en.wikipedia.org/w/index.php?title=The_Sims_Social&oldid=447170639>, 5 pages.

'Social network game' [online]. Wikipedia, 2011, [retrieved on Mar. 9, 2012]. Retrieved from the Internet: <URL: http://en.wikipedia.org/w/index.php?title=Social_network_game&oldid=420229532>, 2 pages.

'Average Revenue per User' [online]. Wikipedia, 2011, [retrieved on Mar. 9, 2012]. Retrieved from the Internet: <URL: http://en.wikipedia.org/w/index.php?title=Average_revenue_per_user&oldid=405939523>, 2 pages.

'SPSS' [online]. Wikipedia, 2011, [retrieved on Mar. 9, 2012]. Retrieved from the Internet: <URL: http://en.wikipedia.org/w/index.php?title=SPSS&oldid=413131910>, 5 pages.

'R (programming language)' [online]. Wikipedia, 2011, [retrieved on Mar. 9, 2012]. Retrieved from the Internet: <URL: http://en.wikipedia.org/w/index.php?title=R_(programming_language)&oldid=414363971>, 8 pages.

'SAS (software)' [online]. Wikipedia, 2011, [retrieved on Mar. 9, 2012]. Retrieved from the Internet: <URL: http://en.wikipedia.org/w/index.php?title=SAS_(software)&oldid=414460982>, 13 pages.

'Game engine' [online]. Wikipedia, 2011, [retrieved on Mar. 9, 2012]. Retrieved from the Internet: <URL: http://en.wikipedia.org/w/index.php?title=Game_engine&oldid=414830407>, 6 pages.

'Advanced Combat Tracker' [online]. EverQuest, 2011, [retrieved on Mar. 9, 2012]. Retrieved from the Internet: <URL: http://web.archive.org/web/20110202105210/http:/advancedcombattracker.com/>, 1 page.

'DKP Log Parser' [online]. Wikipedia, 2009, [retrieved on Mar. 9, 2012]. Retrieved from the Internet: <URL: http://en.wikipedia.org/w/index.php?title=DKP_Log_Parser&oldid=327275134>, 2 pages.

'Dragon kill points' [online]. Wikipedia, 2011, [retrieved on Mar. 9, 2012]. Retrieved from the Internet: <URL: http://en.wikipedia.org/w/index.php?title=Dragon_kill_points&oldid=408517323>, 5 pages.

'Amazon.com' [online]. Wikipedia, 2011, [retrieved on Mar. 9, 2012]. Retrieved from the Internet: <URL: http://en.wikipedia.org/w/index.php?title=Amazon.com&oldid=410552544>, 13 pages.

'Click here for the upsell' [online]. CNNMoney, 2007, [retrieved on Mar. 9, 2012]. Retrieved from the Internet: <URL: http://money.cnn.com/magazines/business2/business2_archive/2007/07/01/100117056/>, 4 pages.

'Google Uses Amazon's Algorithm for YouTube's Recommendation Engine' [online]. Search Engine Land, 2011, [retrieved on Mar. 9, 2012]. Retrieved from the Internet: <URL: http://en.wikipedia.org/w/index.php?title=Zynga&oldid=416458495>, 4 pages.

'Zynga' [online]. Wikipedia, 2011, [retrieved on Mar. 9, 2012]. Retrieved from the Internet: <URL: http://en.wikipedia.org/w/index.php?title=Zynga&oldid=416458495>, 9 pages.

'In-memory database' [online]. Wikipedia, 2011, [retrieved on Mar. 9, 2012]. Retrieved from the Internet: <URL: http://en.wikipedia.org/w/index.php?title=In-memory_database&oldid=415857847>, 4 pages.

'Analyzing human behavior from multiplayer online game logs—A knowledge discovery approach' [online]. Shim et al., 2010, [retrieved on Mar. 28, 2012]. Retrieved from the Internet: <URL: http://www-users.cselabs.umn.edu/classes/Fall-2010/csci8001/Readings/ieee-IS-Minnesota.pdf>, 6 pages.

'Technical Report TR 09-013' [online]. Kawale et al., 2009, [retrieved on Mar. 28, 2012]. Retrieved from the Internet: <URL: http://www.cs.umn.edu/tech_reports_upload/tr2009/09-013.pdf>, 11 pages.

Borbora et al., "Churn prediction in MMORPGs using player motivation theories and an ensemble approach," *IEEE*, 2011, pp. 157-164.

\* cited by examiner

THIRD-PARTY RECOMMENDATION IN GAME SYSTEM

BACKGROUND

The game industry has undergone significant growth and development in recent years. The market for video games was initially tied to company-specific hardware devices, and only later were generic platforms introduced for which developers could independently create games. The game industry is currently expanding into the fields of online gaming and mobile games, in part due to the popularization of smartphones and other handheld digital devices.

Game publishers rely on different monetization approaches. In some games, advertising and sale of virtual goods or services are used. For example, in some so-called "freemium" games the user can play the game for free, with the option of paying money for extra game content that is otherwise not available. In such situations, one business goal is to maximize the revenue from such sources. Strategies for doing so can include: seeking to keep a player engaged in the game, attempting to make games viral, encouraging players to buy virtual goods or services, seeking to increase the amount of money each player spends, seeking to minimize the attrition (or churn) of players, and seeking to leverage social graphs of trendsetters.

SUMMARY

In a first aspect, a computer-implemented method for using a third-party recommendation in a game system includes: receiving, at a recommendation engine and from a game system, current game context data provided in real time during a game in which at least one user participates; selecting, by the recommendation engine, at least one of multiple predefined actions based on at least the current game context data; and providing a response to the game system that identifies the selected at least one action for performance.

In a second aspect, a computer program product tangibly embodied in a computer-readable storage medium includes instructions that when executed by a processor perform a method for using a third-party recommendation in a game system. The method includes: receiving, at a recommendation engine and from a game system, current game context data provided in real time during a game in which at least one user participates; selecting, by the recommendation engine, at least one of multiple predefined actions based on at least the current game context data; and providing a response to the game system that identifies the selected at least one action for performance.

A system includes: one or more processors; and a computer program product tangibly embodied in a computer-readable storage medium and comprising instructions that when executed by the one or more processors perform a method for using a third-party recommendation in a game system. The method includes: receiving, at a recommendation engine and from a game system, current game context data provided in real time during a game in which at least one user participates; selecting, by the recommendation engine, at least one of multiple predefined actions based on at least the current game context data; and providing a response to the game system that identifies the selected at least one action for performance.

Implementations can include any or all of the following features. Before receiving the current game context data the method further includes: receiving, at the recommendation engine and from the game system, past game context data that the game system has recorded during earlier performances of the game, the past game context data reflecting user decisions; determining, by the recommendation engine, circumstances preceding at least one type of user decision; determining, by the recommendation engine, a correlation between the determined circumstances and a player profile or game behavior; storing definitions of the multiple predefined actions; and building at least one predictive model based on the determined circumstances and correlation; wherein the recommendation engine uses the predictive model in selecting the at least one of the multiple predefined actions. The type of user decision involves converting from a free player to a paying player. The type of user decision involves making a purchase within the game. The type of user decision involves abandoning the game. Using the predictive model in selecting the at least one of the multiple predefined actions includes: monitoring all game events in real time; selecting at least one significant event based on the monitoring; selecting at least one of multiple predictive models for the selected significant event; and executing the selected predictive model with the received current game context data; wherein the at least one of multiple predefined actions is selected based on an outcome of executing the selected predictive model. The method further includes evaluating a result of performing at least the action and making one or more modifications of the recommendation engine based on the evaluation.

Implementations can provide any or all of the following advantages. Providing effective game analytics in real time can improve the commercial viability of a game. Predictive game analytics can ensure that the right recommendation is provided to the right player at the right time. Use of an external real-time recommendation engine can increase players' enjoyment of a game, sustain more long term player commitment and loyalty, and increase game revenue.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes examples providing real-time analytics for a game or other scripted or semi-scripted user process using an external recommendation engine. In some implementations, a game company can interface its game server (or other gaming device or system) with a real-time recommendation engine from a third party and thereby get improved user satisfaction and business performance. For example, the recommendation can involve one or more actions performed with regard to the user. In some implementations, the third party provides such recommendation analytics as a service to one or more customers, for example through a cloud system or other system.

Figure 1:
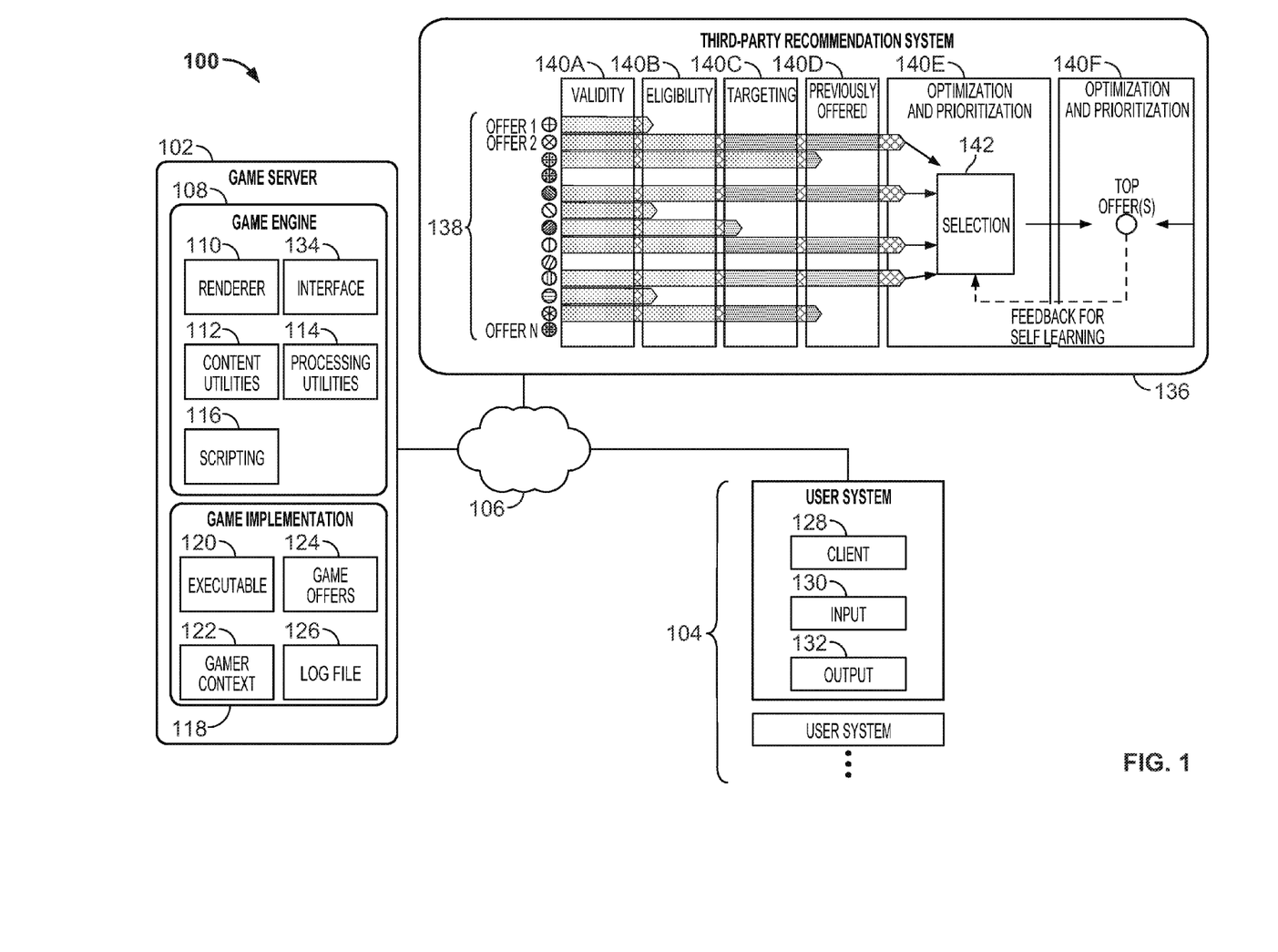
FIG. 1 shows an example system that can use a third-party recommendation.

FIG. 1 shows an example system 100 that can use a third-party recommendation. The system 100 includes at least one game server 102 and one or more user systems 104, that communicate with each other and/or other systems through any suitable network 106. In some implementations, the network 106 can include a local network, an intranet or the internet. The game server(s) 102 can be implemented using any suitable physical computer structure including, but not limited to, one or more server devices, cloud systems, personal computers and/or special-purpose systems. The user system(s) 104 can be implemented using any suitable physical computer structure including, but not limited to, one or more game consoles, handheld controllers, laptop computers, smartphones, handheld digital devices and/or cellular phones, to name just a few examples. While the game server 102 and the user system(s) 104 are shown as separate systems in this example, they can be integrated in some implementations.

The game server 102 here includes at least one game engine 108 that serves as the platform or foundation for one or more developed games. In some implementations, the game engine 108 is designed with a particular category or field of games in mind. For example, the game engine can be geared toward one or more of first-person shooter games, massively-multiplayer online games, flight/driving simulator games, action-adventure games, role playing games, sports games, strategy games, labyrinth games, social network games and/or other types of games.

The game engine 108 includes one or more components that allow it to serve as a platform for different kinds of games being developed. Here, the game engine includes at least one renderer 110 that is configured for rendering visual game content into a format that is compatible with one or more types of displays. For example, the renderer can be tailored for outputting video content suitable for a personal computer (e.g., in a browser), the display of a handheld gaming system, or a smartphone screen.

The game engine 108 includes one or more utilities that are here shown as content utilities 112 and processing utilities 114. For example, the content utilities 112 include, but are not limited to, a physics solver for handling forces and other interactions between objects; a sound component generating game audio content; an animation component that provides motion for game objects, such as by simulation; and a scene graph that defines one or more game scenes. Other content utilities can be used.

The processing utilities 114 can include, but are not limited to, a networking component, such as for multi-player games; a streaming component, such as for delivering game content in real time; a memory management component; a localization component, such as for providing geographically targeted features; and a threading component, to name a few examples. Other processing utilities can be used.

The game engine 108 can include a scripting component 116. In some implementations, the scripting component defines and manages the use of, and interaction between, the game engine's utilities or renderer. For example, the scripting component controls when and how and by whom various utilizes can be invoked.

One or more specific games can be developed based one the game engine 108 and/or other resources. Here a particular developed game (e.g., an action adventure or a social network game) is schematically illustrated as a game implementation 118. For example, the game implementation 118 makes use of the game engine 108 for the scene graphs, physics simulations, audio generation, and rendering of game output. As such, the game implementation here includes at least one executable component 120 that is used to install the game (e.g., on the game server 102 and/or on the user system(s) 102), and/or to launch the game (e.g., a user activates the executable component to start a new game session).

Each session where a user plays the game is characterized by gamer context 122. In some implementations, the game context can include static and dynamic information. For example, user demographic data can be included in the gamer context 122. As another example, the user's history of playing the game and/or the current game state can be included in the gamer context.

As the game progresses, one or more game offers 124 or other recommendations can be made to the player. Such offers or recommendations can involve, but are not limited to, purchasing a good or service in the game (e.g., a virtual tool or a character property), registering the user's name and/or other identifying information, subscribing to content, conveying information about the game to others (e.g., through a social network), purchasing goods or services marketed by the game vendor or a third party, or choosing between alternative modes or other options in the game, to name just a few examples.

The game server 102 and/or the user system(s) 104 can record some or all of what happens in the game during play. The game implementation can have a log file 126 or other record where such information is collected. For example, this tracking can cover information about the user(s), the time(s) and location(s) of the play, the individual events that occurred during the play, and the user interactions that triggered the event(s). Any suitable data structure or format can be used for documenting and storing the game information, such as, but not limited to, one or more types of markup code (e.g., XML).

Information about individual gamers or other users/participants is collected and handled in ways that seek to ensure compliance with privacy regulations and any other applicable laws, regulations or preferences. In some implementations, user data (e.g., demographics) can be anonymized within the game server 102 to prevent personal information from being revealed. As another example, appropriate data security measures (e.g., encryption) can be used when information is transmitted or stored. In some implementations, a user can create a preference profile that indicates what types of offers or other recommendations the user is, or is not, interested in receiving.

The user system(s) 104 here include at least one client 128, one or more input devices 130 and one or more output devices 132. The client 128 can include a browser program, optionally having one or more plug-in components; a native or otherwise proprietary user interface of a particular gaming system; or a dedicated framework on a smartphone operating system, to name just a few examples. The input device(s) 130 can include a touchscreen, keypad, joystick, motion sensor (e.g., accelerometer), microphone, data glove, headset, or any other game controlling device, to name some examples. The output device(s) 132 can include, but are not limited to, a display screen (e.g., LCD), speaker, headphones, motor, heating or cooling component, and/or a tactile device.

During gameplay, one or more visual outputs (e.g., game screens) are presented one the output device(s) 132 (e.g., using the client 128), and the user makes one or more game inputs using the input device(s) 130. For example, the user controls a game character with a joystick and manipulates a virtual object in the game (e.g., a tool or a weapon) using one or more buttons. The effects of the game input is that the state of the game is altered in one or more ways and this can lead to a corresponding update of the visual and/or audio game output.

One or more of the game offers 124 can be made to a player or other user. In the shown implementation, the game engine 108 has an interface 134 that allows for communication to and from one or more third-party recommendation systems 136. In some implementations, the interface 134 can include an application programming interface (API) that allows the game engine to export and import data or other information in real time. For example, the interface 134 can provide the recommendation system 136 access to some or all of the log file 126, and can provide input that the game engine acts on in real time (e.g., the selection of a particular recommendation to make during gameplay). In some implementations, the interface 134 can be provided in form of one or more memory addresses or other data locations to which the recommendation system 136 and the game engine 108 (e.g., some or all of its utilities) both have access. Other forms of interfacing can be used.

The recommendation system 136 is here schematically illustrated as performing a selection in real time between a number of separate recommendations, in this example shown as offers 138. More particularly, there are here N number of recommendations to choose between, and they are labeled "Offer 1" through "Offer N". That is, the N number of offers 138 may have been created as a predefined library of offers/recommendations that should be available at one or more points during gameplay. Making any one of the recommendations or offers can involve performing one or more actions with regard to the user or player, such as in real time with the gameplay. For example, performing such action in the game can include, but is not limited to, displaying a visual message, playing an audio signal or message, or generating another game device output. As another example, the recommendation can instead or also be generated in one or more other ways. For example, a portal communication, social network message, email, text message, or the like, can be generated. In some implementations, the recommendation analysis is a solution provided by the recommendation system 136 as a service to the game server 102 (and/or other systems), for example over the internet.

The recommendation system 136 in this example generates a recommendation by subjecting the offers 138 to one or more phases 140. In some implementations, a validity check can be performed (140A). For example, any of the offers 138 that is defined as being valid only during a certain time interval is omitted or ignored as invalid at other times. In some implementations, an eligibility check can be performed (140B). For example, any of the offers 138 that apply only to gamers who have reached at least a certain game level can be filtered out for lack of eligibility. In some implementations, a targeting check can be performed (140C). For example, one or more aspects of the gamer context 122 can be taken into account in choosing among the offers 138. In some implementations, a previously-offered check can be performed (140D). For example, any offer that has previously been made to the particular player (e.g., as indicated by the gamer context 122 and/or the log file 126) can be omitted. In some implementations, the validity, eligibility, targeting and previously-offered checks 140A-D are considered an "arbitration phase" for the recommendation system 136. For example, the arbitration phase can choose among the offers 138 based on player context and eligibility criteria.

In some implementations, a first optimization and prioritization check can be performed (140E). For example, the first check 140E can evaluate those of the offers 138 that the recommendation system 136 has not yet excluded in any earlier phase. This check can involve making one or more predictions using a predefined model. For example, the recommendation engine can predict which one(s) of the offers 138 should be made, based on propensity scores for the player(s), the goals of the recommendation process, and the value to the game publisher. Some examples of prediction models will be described later.

The processing by the recommendation engine 136 is performed in real time and can take into account some or all of the gamer context 122 and/or the log file 126. A selection 142 by the recommendation system 136 identifies the recommendation(s) to be made. For example, one or more offers that remained after phases 140A-D can be chosen. The recommendation system communicates the selection so that it can be applied in the game.

A second optimization and prioritization check can be performed (140F). In some implementations, the second check 140F can determine what the outcome, if any, was of making the selected recommendation to the player. For example, successful recommendations are noted, and unsuccessful recommendations can lead to modification of the offer(s), or the predictive logic of the recommendation system 136, or both.

Figure 2:
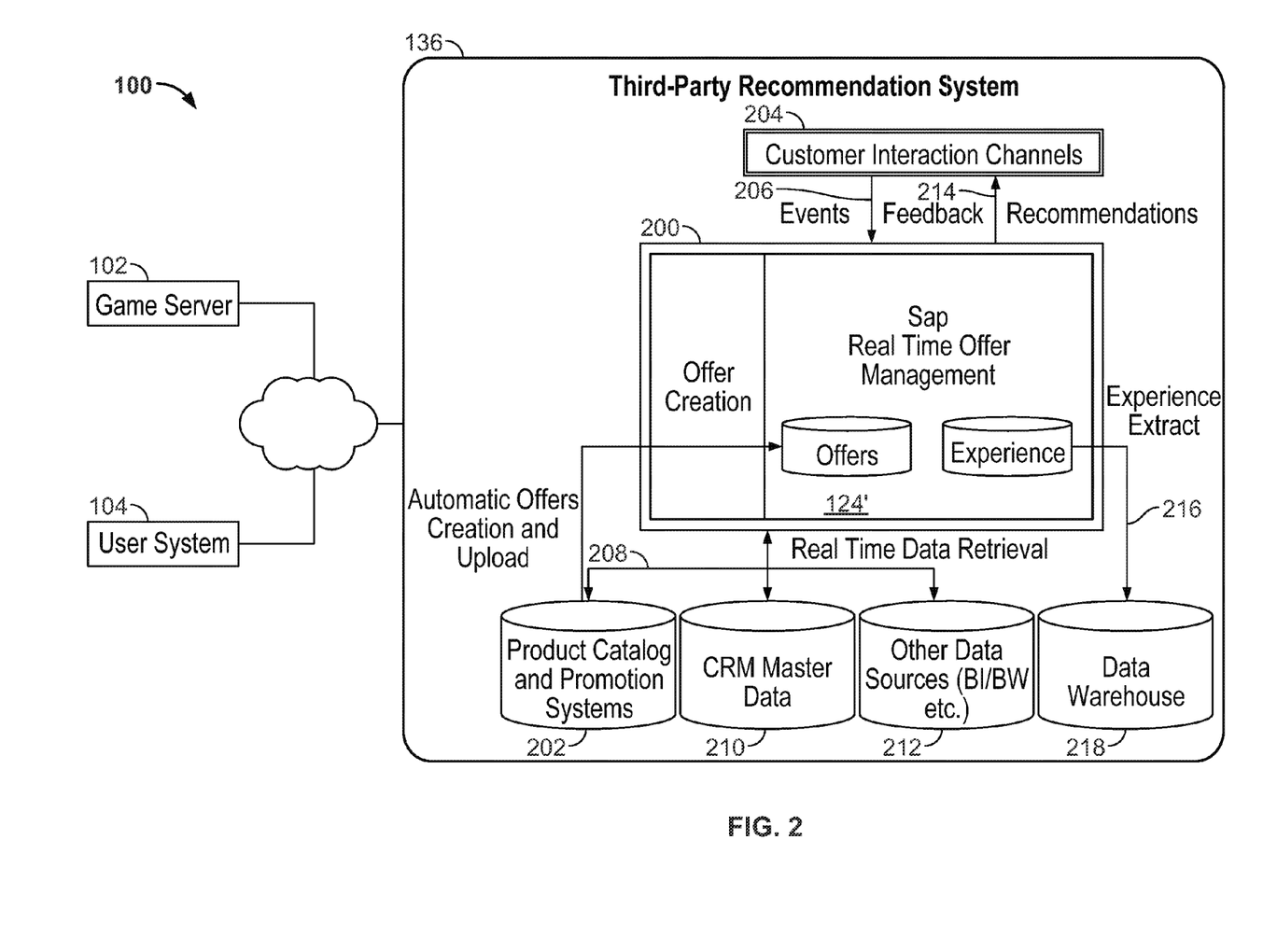
FIG. 2 shows another example relating to the system in FIG. 1.

FIG. 2 shows another example relating to the system 100 in FIG. 1. Here, the game server 102, the user system 104 and the recommendation system 136 are shown. The recommendation system includes at least one recommendation engine. In this example, the recommendation system includes Real Time Offer Management (RTOM) 200 available from SAP AG. In other implementations, one or more different recommendation engines can be used. There will now be described examples of operations that can be performed in using the recommendation system 136 to make real-time recommendations.

Offers or other recommendations can be created and uploaded to the RTOM 200 or other recommendation engine, for example so that the third-party recommendation system 136 will provide recommendation analytics as a service. In some implementations, one or more offers are derived based on a resource 202, such as a product catalog and/or a promotion system. For example, the created offer can seek to change a user from being a free player into being a paying player. In some implementations, one or more external offers can be uploaded that were created elsewhere.

One or more events from a customer interaction channel 204 are received (206) to trigger a real-time recommendation process, and corresponding information is provided to the recommendation engine. In some implementations, one or more of the following types of information can be used:

| Parameter | Examples |
| --- | --- |
| Player history | The user's history of spending virtual currency (e.g., how much, how often, what type of virtual goods) |
| | Games played (e.g., historically or concurrently) |
| Customer segmentation | Based on stored user data (e.g., customer record) |
| | Based on player behavior |
| Game context | Level |
| | Game situation, potential next steps |
| Time | Local to the player |
| Location | Indirectly indicated (e.g., by ISP or customer data) |
| | Directly indicated (e.g., by GPS) |

| Parameter | Examples |
|---|---|
| Customer value | Social circle or level of influence |
| | Customer value score |
| Social media | Information from social network (e.g., if game provided in such network) |
| Payment | Payment channel |
| | Fraud level |
| Game behavior | Offensive or defensive |
| | Slow or fast |
| | . . . |

The recommendation engine can retrieve additional data in real time at 208. In some implementations, the resource 202 or one or more other resources 210 or 212 can be accessed. For example, CRM data and/or business intelligence (BI) data and/or business warehouse (BW) data can be retrieved.

Based on the available information, the RTOM 200 or other recommendation engine in real time determines the best recommendation(s) to make. In some implementations, the recommendation engine chooses among the game offers 124. One or more recommendations can be made to the customer interaction channel 204 at 214. For example, the selected offers are identified.

At 206, feedback can also be received for learning, re-offer policy and analysis. In some implementations, experience data is extracted at 216, exported, and stored in a data warehouse 218. For example, analytics can be performed on the extracted data.

In some implementations, the offers 124 can seek to accomplish one or more particular goals or objectives for the game publisher or vendor. A first scenario involves increasing conversion rate. In some gaming contexts, 1-3% of gamers pay money in some form as part of the play, and the remainder do not pay to play. Converting a user from a free player to a paying player is therefore valuable to the game publisher. For example, a general idea is to seek to understand one or more factors that make a player purchase a virtual good or service for the first time. Based on such information, offers to make the purchase more appealing can be created and delivered to individual players at the appropriate time(s).

A second scenario involves increasing revenue per player. While game publishers generally earn more revenue the more players spend on virtual goods and services, the publisher must however ensure that the player receives adequate value for the money spent. By contrast, a game (or other) environment that encourages or forces increased spending can lead to user frustration and churn.

A third scenario involves increasing the retention rate of paying players. Generally, when a paying player ceases to play a game, there is direct revenue loss for the game publisher. That is, ceasing to play the game here refers to the player's deliberate action of quitting the game for the foreseeable future, perhaps to never again play the game (e.g., the player permanently abandons the game). Gamers choose to do this for various reasons. For example, the user finishes the game; the user gets stuck and becomes frustrated with the game; the player's friends move on to another game (or activity); or the user becomes bored with the game. Some implementations seek to detect abandonment behavior early and send re-engagement messages to the user. It is important that such messages be relevant to the player (or else they might be disregarded as spam), and that they are context aware (e.g., that they address the likely root cause).

The recommendation system 136 can be specially designed or configured in an effort to address one or more situations (e.g., those mentioned above). In some implementations, the recommendation system 136 can be trained using historical data (e.g., past game context) that the game system has recorded during earlier performances of the game. Such historical data can then reflect user decisions by one or more players, such as decisions to become a paying player, to increase the amount spent, or to abandon the game. Circumstances that precede at least one type of user decision are determined from the historical data. For example, it may be detected that certain players often make a purchase within their first ten hours of playing the game. As another example, situations that precede game abandonment can be analyzed. A correlation between the determined circumstances and a player profile or game behavior can then be determined. Definitions of the various offers, recommendations, or other actions toward the user, can then be defined. A predictive model can be built and used by a recommendation engine in selecting at least one recommendation or other action to perform at a given time.

Figure 3:
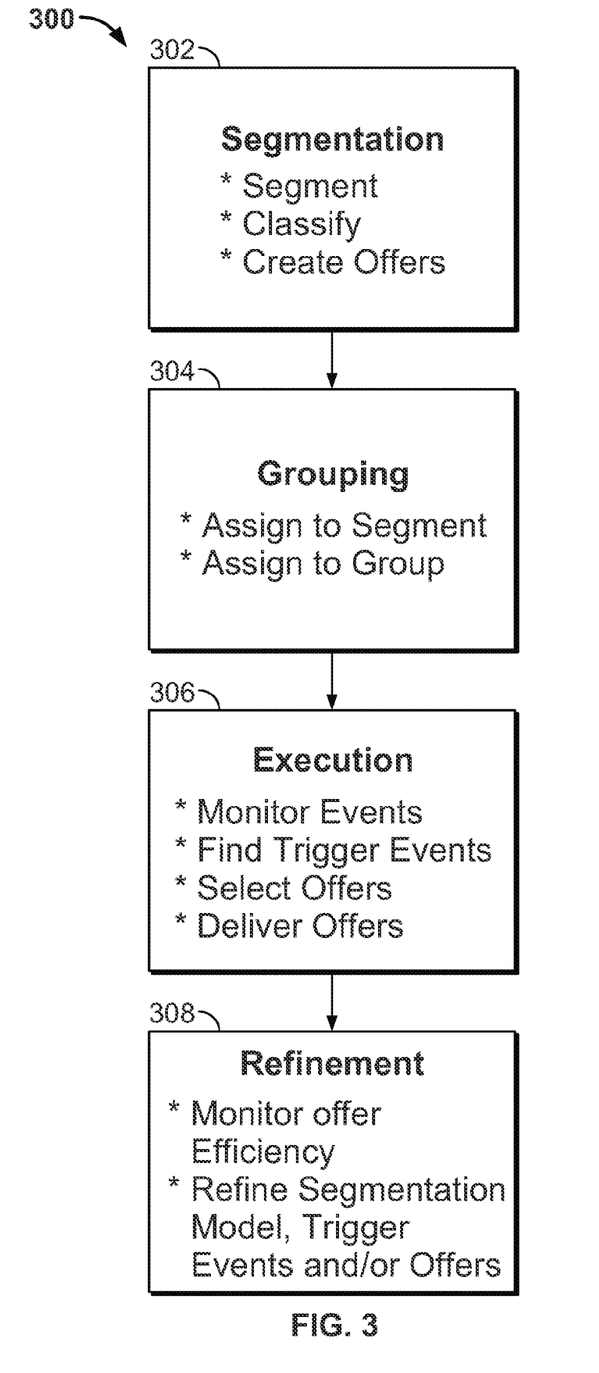
FIG. 3 shows a flowchart of an example process.

FIG. 3 shows a flowchart of an example process 300. At 302, segmentation is performed. For example, user segments can be created that take into account one or more characteristics, such as whether the player makes a purchase within their first ten hours of playing the game. A classification algorithm can be applied to historical game data to assign individual users to the various segments. A matrix of offers can be created that is indexed by segment, group and triggering event.

At 304, grouping of a new player is performed. For example, the classification algorithm can be used to assign the new player to one of the segments. As another example, the player can instead or in addition be assigned to a test or control group.

Figure 4:
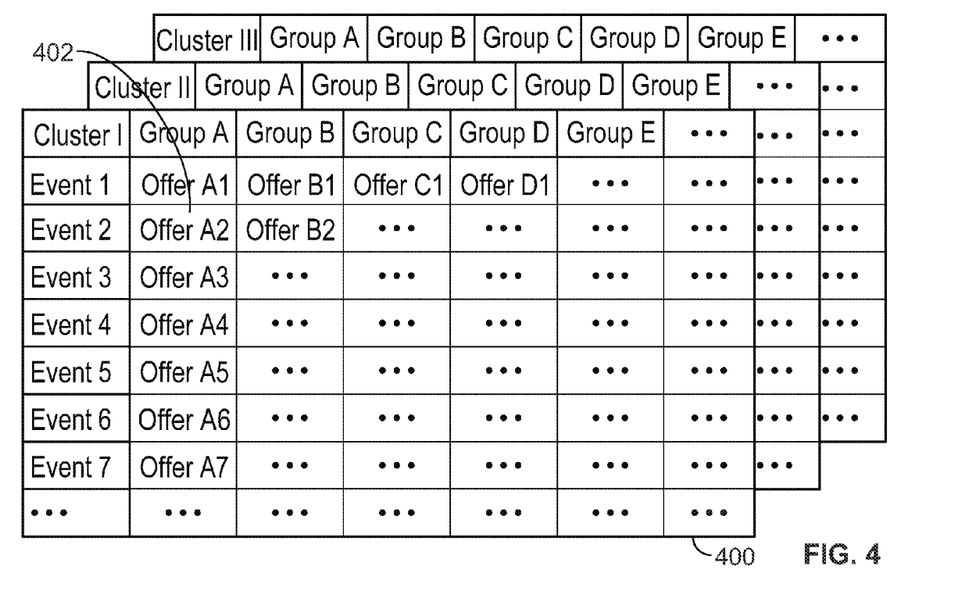
FIG. 4 shows examples of recommendation matrices.

FIG. 4 shows examples of recommendation matrices 400. Each recommendation matrix relates to a particular user cluster (e.g., Clusters I, II and III in this example). On each recommendation matrix, different groups (e.g., Groups A, B, . . . ) of users are separated into columns. For each group, the matrix identifies the offer to make for that user when any of a number of events is detected. For example, a matrix cell 402 indicates that when a player from Group A encounters Event 2 in the game, Offer A2 should be made. Other ways of organizing offers or other actions can be used.

Returning now to FIG. 3, at 306, the game is executed. During gameplay events can be monitored and special trigger events can be sought. When finding a trigger event, a particular offer or other recommendation can be delivered. In one example, detection of a trigger event and responding to it can be done according to the following pseudocode description:

```
triggerEvent = "wounded"
if( event == "wounded") then
    offer( potion at discount)
```

That is, the above example shows that the game state where the player's character is "wounded" is defined as being a trigger event. When this event is detected, one or more offers should be made or other action be taken. Particularly, the action here is to offer the player a virtual portion at a discount.

At 308, refinement is performed. For example, the effectiveness of offers can be monitored, in normal play and/or within a user test group. This can lead to refinement of the segmentation model (e.g., one or more of the classification algorithms), the definitions of triggering events, and/or of the actions being taken.

Figure 5:
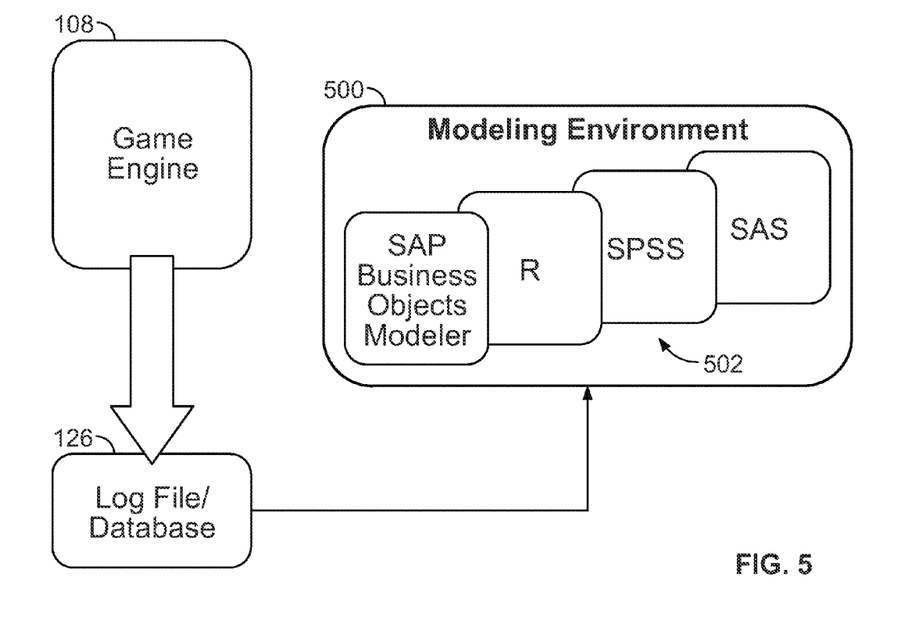
FIG. 5 schematically shows an example of creating predictive models.

FIG. 5 schematically shows an example of creating predictive models. In some implementations, the creation of predictive models allows recommendation analytics to be provided as a service to one or more customers, such as by a cloud system. This example involves the game engine 108 and the log file 126. In some implementations, a database can be used instead of, or with, the log file 126. First, a statistically significant portion of available data is loaded from the log file as training data. The training data is loaded into a modeling environment 500 that includes one or more modeling tools 502. The modeling tools 502 can be commercially available tools or proprietary solutions. For example, the modeling tools 502 can include, but are not limited to, an SAP business object modeler, a modeler for the programming language R, a statistical package for social sciences (SPSS) program, and/or a statistical analysis system (SAS) program.

The goal of the model can be identified, for example to predict the level at which a given player is likely to quit playing the game. Predictor variables in the training data can be reduced to the relevant ones in the modeling environment 500. For example, one user characteristic and/or one game scenario may be a better predictor of abandonment than other variables. Suitable statistical models can then be tested, the results compared in terms of their respective strengths of prediction, and the most suitable algorithm can be selected for the goal that was set for the predictive model.

Figure 6:
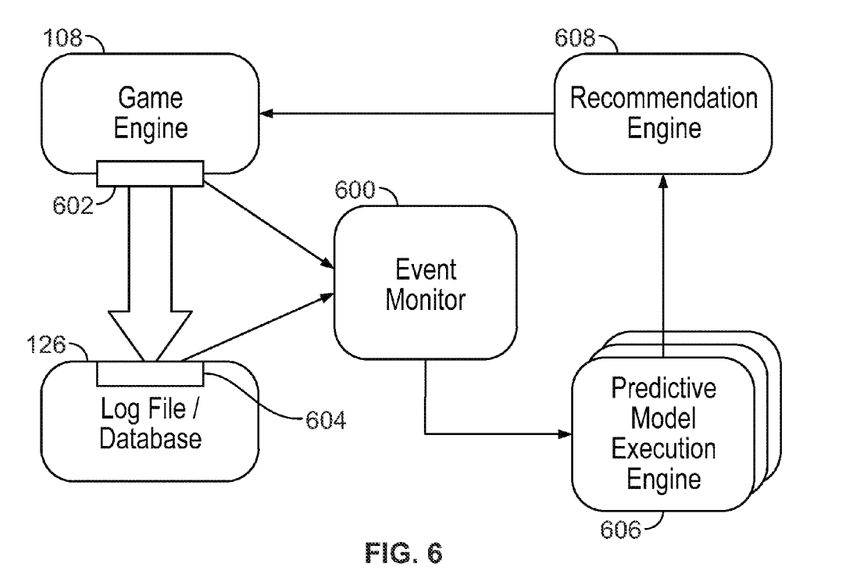
FIG. 6 schematically shows an example of applying predictive models.

FIG. 6 schematically shows an example of applying predictive models. This example also involves the game engine 108 and the log file 126. In short, this example involves monitoring game events in real time, selecting at least one significant event based on the monitoring, selecting at least one of multiple predictive models for the selected significant event, executing the selected predictive model with received current game context data, selecting at least one of multiple predefined actions based on executing the selected predictive model, and performing the selected action(s). In some implementations, predictive models are used in providing analytics as a service.

An event monitor 600 scans all game events in real time. That is, event data is accessed in the logging infrastructure. For example, the event monitor can be implemented as part of a logwriter component 602 in the game engine, or as a monitoring component 604 in the log file (or database).

The event monitor 600 selects significant events and invokes a specified predictive model. For example, events such as "before battle", "new level reached" or "at death" can be considered trigger events. As additional examples, a "free2pay" predictive model can be invoked upon the "before battle" event; a "player retention" predictive model can be invoked.

The event monitor 600 provides relevant information to at least one predictive model execution engine 606. In some implementations, the provided information indicates at least the event information (e.g., event identifiers) and the selected predictive model (e.g., a model identifier).

The predictive model execution engine 606 executes the selected model with the relevant input data. For example, data regarding one or more events that have been detected, optionally together with other contextual information, can be used. The result can be one or more predictions. For example, the engine 606 can determine based on the available information that the player has an 82% likelihood of churning. Such likelihoods can be determined for one or more particular amounts of time. For example, the player's likelihood of purchasing a virtual item within the next few hours of play, or of churning within the next three months, can be predicted. Other predictions regarding the player(s) can be made.

The result from the predictive model execution engine 606 (e.g., an estimated probability) can be provided to a recommendation engine 608 that selects at least one action to perform (e.g., chooses one or more offers) and provides that information to the game engine 600. For example, the SAP RTOM 200 (FIG. 2) can be used in some or all of the processing. The game engine can then execute the selected action(s), for example by reading one or more offer identifiers provided by the engine 608, retrieving the corresponding offer(s), and presenting the offer(s) to the player. For example, when more than one action is recommended with regard to a player, they can be performed essentially at the same time or at two or more different times.

Figure 7:
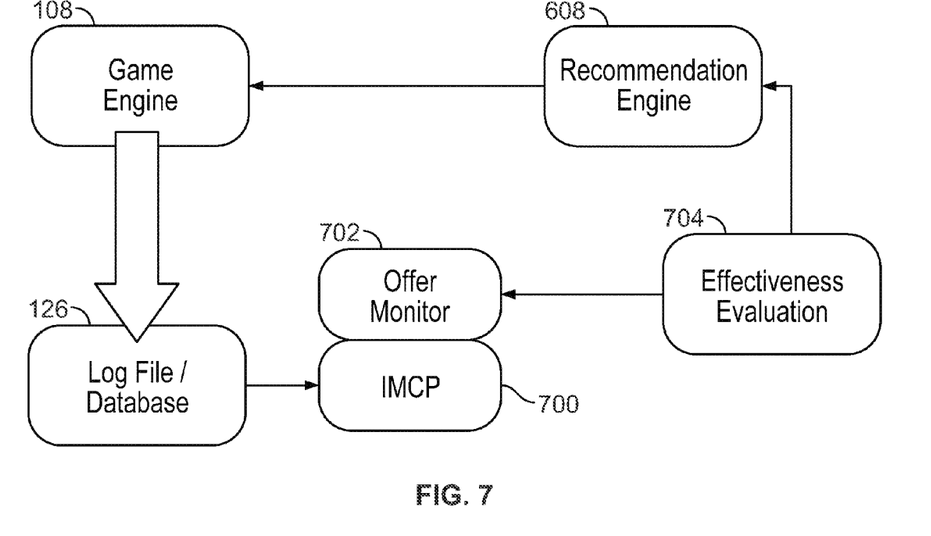
FIG. 7 schematically shows an example of testing and adjusting recommendations.

FIG. 7 schematically shows an example of testing and adjusting recommendations. This example also involves the game engine 108, the log file 126 and the recommendation engine 608. In short, this example involves evaluating a result of performing an action and making one or more modifications of the recommendation engine based on the evaluation.

Some or all information from the log file 126 can be provided to an in-memory computing platform 700. The information can include game data that is continuously loaded into the platform 700. For example, game data can reflect the offers made (or other actions taken), as well as whether the user accepted the offers (or otherwise responded to the performed action(s)).

In some implementations, the platform 700 can operate by storing one or more databases entirely or mainly in memory, as opposed to on disk, etc. Using in-memory techniques can speed up the access and retrieval of data, and can therefore help provide the quick turnaround time needed for making recommendations essentially in real time. For example, the HANA™ platform available from SAP AG uses in-memory database technology and can be used as the platform 700.

An offer monitor 702 monitors some or all information available in the in-memory computing platform 700. For example, the offer monitor can detect information that reflects whether offers have been successful or unsuccessful. In some implementations, other recommendations and/or actions are performed with regard to players, and information about their effectiveness can then be monitored in a similar way.

In some implementations, an external effectiveness evaluation 704 can be performed. For example, one or more persons involved with production or development of the game can be given access to some or all information from the offer monitor 702. This can give the person insight into the effectiveness of offers, and the person can then make one or more adjustments as appropriate. For example, the person can make or suggest an adjustment of the offer pool, such as by modifying an offer, eliminating an offer, and/or adding one or more new offers. Such adjustments can be applied to the recommendation engine 608.

Figure 8:
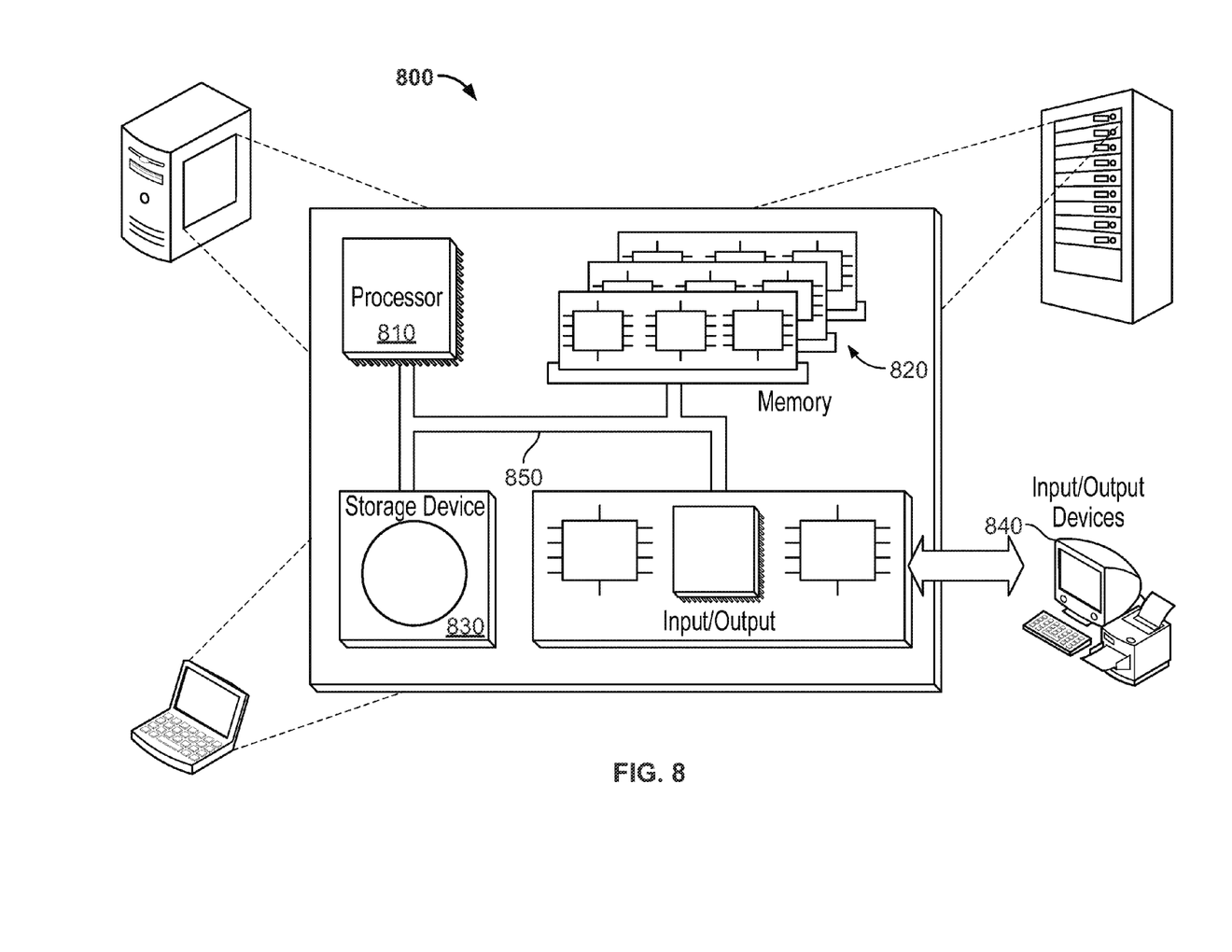
FIG. 8 is a block diagram of a computing system that can be used in connection with computer-implemented methods described in this document.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit in some implementations and is a non-volatile memory unit in other implementations.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method to generate a recommendation in a computerized game system, the method comprising:
receiving, by a first computing system and as having been sent from a second computing system at which a computerized video game is executing:
(i) data that identifies that a predetermined event has occurred in the computerized video game as a result of a user playing the computerized video game, and
(ii) data that identifies a current state of the computerized video game; selecting, by the first computing system and in response to the first computing system having received the data that identifies that the predetermined event has occurred in the computerized video game and having received the data that identifies the current state of the computerized video game, a particular computer-executable prediction model that corresponds to the predetermined event from among a collection of computer-executable prediction models that correspond to respective events that occur through play of the computerized video game;
executing, by the first computing system and in response to the first computing system having selected the particular computer-executable prediction model, the particular computer-executable prediction model with the received data that identifies the current state of the computerized video game as input data to the particular computer-executable prediction model, in order to cause the first computing system to determine a probability that the user of the computerized video game will purchase a virtual good or service of the computerized video game;
selecting, by the first computing system, a recommendation that the user purchase the virtual good or service of the computerized video game, from among a collection of recommendations, through use of the determined probability that the user of the computerized video game will purchase the virtual good or service of the computerized video game; and sending, by the first computing system and for receipt by the second computing system at which the computerized video game is executing, information that identifies the recommendation which was selected by the first computer system through use of the determined probability, in order to cause the second computing system to display, to the user within the computerized video game, the recommendation to purchase the virtual good or service.

2. The computer-implemented method of claim 1, further comprising, before the first computing system selects the recommendation that the user purchase the virtual good or service of the computerized video game from among the collection of recommendations, identifying, by the first computing system, the collection of recommendations as a subset of a plurality of recommendations that:
  (i) apply once the predetermined event has occurred, and
  (ii) omit multiple recommendations from the plurality of recommendations that were previously presented to the user.

3. The computer-implemented method of claim 1, wherein the collection of recommendations includes a recommendation to share information about the computerized video game with other individuals through use of a social network.

4. The computer-implemented method of claim 1, further comprising determining, by the first computing system, that the user responded to the recommendation that the user purchase the virtual good or service of the computerized video game, and as a result, modifying the particular computer-executable prediction model.

5. A system comprising:
  one or more processors; and
  a computer-readable storage device comprising instructions that, when executed by the one or more processors, cause performance of a method to generate a recommendation in a computerized game system, the method comprising:
    receiving, by a first computing system and as having been sent from a second computing system at which a computerized video game is executing:
      (i) data that identifies that a predetermined event has occurred in the computerized video game as a result of a user playing the computerized video game, and
      (ii) data that identifies a current state of the computerized video game;
    selecting, by the first computing system and in response to the first computing system having received the data that identifies that the predetermined event has occurred in the computerized video game and having received the data that identifies the current state of the computerized video game, a particular computer-executable prediction model that corresponds to the predetermined event from among a collection of computer-executable prediction models that correspond to respective events that occur through play of the computerized video game;
    executing, by the first computing system and in response to the first computing system having selected the particular computer-executable prediction model, the particular computer-executable prediction model with the received data that identifies the current state of the computerized video game as input data to the particular computer-executable prediction model, in order to cause the first computing system to determine a probability that the user of the computerized video game will purchase a virtual good or service of the computerized video game;
    selecting, by the first computing system, a recommendation that the user purchase the virtual good or service of the computerized video game, from among a collection of recommendations, through use of the determined probability that the user of the computerized video game will purchase the virtual good or service of the computerized video game; and
    sending, by the first computing system and for receipt by the second computing system at which the computerized video game is executing, information that identifies the recommendation which was selected by the first computer system through use of the determined probability, in order to cause the second computing system to display, to the user within the computerized video game, the recommendation to purchase the virtual good or service.

6. The system of claim 5, wherein the method further comprises, before the first computing system selects the recommendation that the user purchase the virtual good or service of the computerized video game from among the collection of recommendations, identifying, by the first computing system, the collection of recommendations as a subset of a plurality of recommendations that:
  (i) apply once the predetermined event has occurred, and
  (ii) omit multiple recommendations from the plurality of recommendations that were previously presented to the user.

7. The system of claim 5, wherein the collection of recommendations includes a recommendation to share information about the computerized video game with other individuals through use of a social network.

8. The system of claim 5, wherein the method further comprises determining, by the first computing system, that the user responded to the recommendation that the user purchase the virtual good or service of the computerized video game, and as a result, modifying the particular computer-executable prediction model.

* * * * *